US009075160B2

(12) United States Patent
Childs et al.

(10) Patent No.: US 9,075,160 B2
(45) Date of Patent: Jul. 7, 2015

(54) INVERSION USING A FILTERING OPERATOR

(75) Inventors: Paul N. Childs, Cambridge (GB); Robin Fletcher, Guildford (GB); Xiang Du, Crawley (GB); Eugene William Starr, Willis, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 536 days.

(21) Appl. No.: 13/463,373

(22) Filed: May 3, 2012

(65) Prior Publication Data

US 2013/0294196 A1   Nov. 7, 2013

(51) Int. Cl.
G01V 1/28 (2006.01)
G01V 1/30 (2006.01)

(52) U.S. Cl.
CPC ............... *G01V 1/301* (2013.01); *G01V 1/282* (2013.01); *G01V 2210/67* (2013.01); *G01V 2210/679* (2013.01)

(58) Field of Classification Search
CPC .............. G01V 1/282; G01V 2210/67; G01V 2210/679
USPC ...................................... 367/38, 68
See application file for complete search history.

(56) References Cited

U.S. PATENT DOCUMENTS 5,274,605 A * 12/1993 Hill ................................ 367/53
8,116,168 B1 * 2/2012 Luo et al. ...................... 367/50
2012/0051176 A1 * 3/2012 Liu ................................ 367/38

OTHER PUBLICATIONS

Fei, "Full Wave Form Inversion for Seismic Data," KSG, Jul. 2011: pp. B1-B12.
Tarantola, "Inversion of seismic reflection data in the acoustic approximation," Geophysics, Aug. 1984, vol. 49(8): pp. 1259-1266.
Fleet et al., "Optical Flow Estimation," Mathematical Models in Computer Vision: The Handbook, Eds. Paragios et al.: Springer, 2005: pp. 1-24.
Yoon et al., "Reverse-time migration using the Poynting vector," Exploration Geophysics, 2006, vol. 37: pp. 102-107.

* cited by examiner

*Primary Examiner* — Mark Hellner
(74) *Attorney, Agent, or Firm* — Colin L. Wier; Rodney Warfford

(57) ABSTRACT

To perform inversion to produce a model of a structure, a filtering operator based at least on an angle between a propagating direction of a source wavefield and a propagating direction of a back-propagated receiver wavefield is computed. The filtering operator is used in performing the inversion to produce the model of the structure.

21 Claims, 4 Drawing Sheets

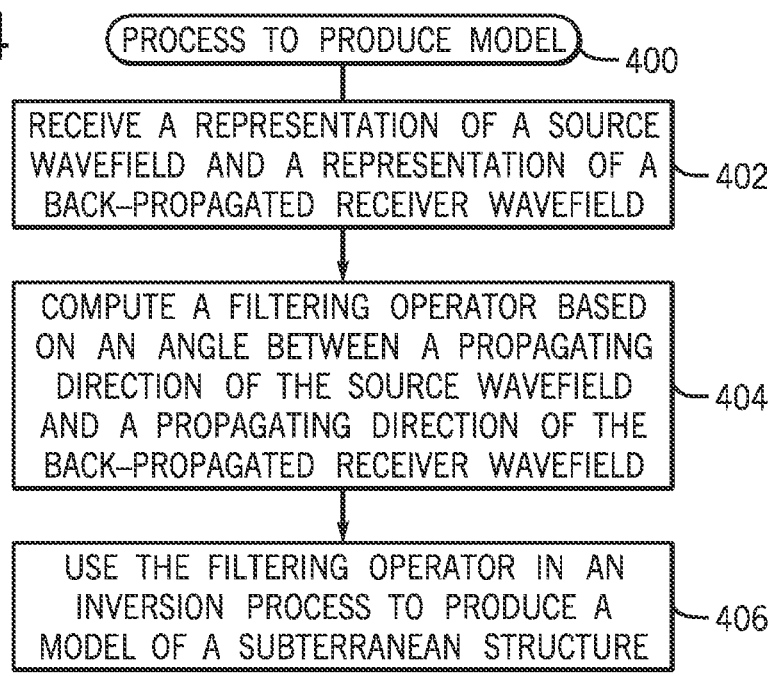
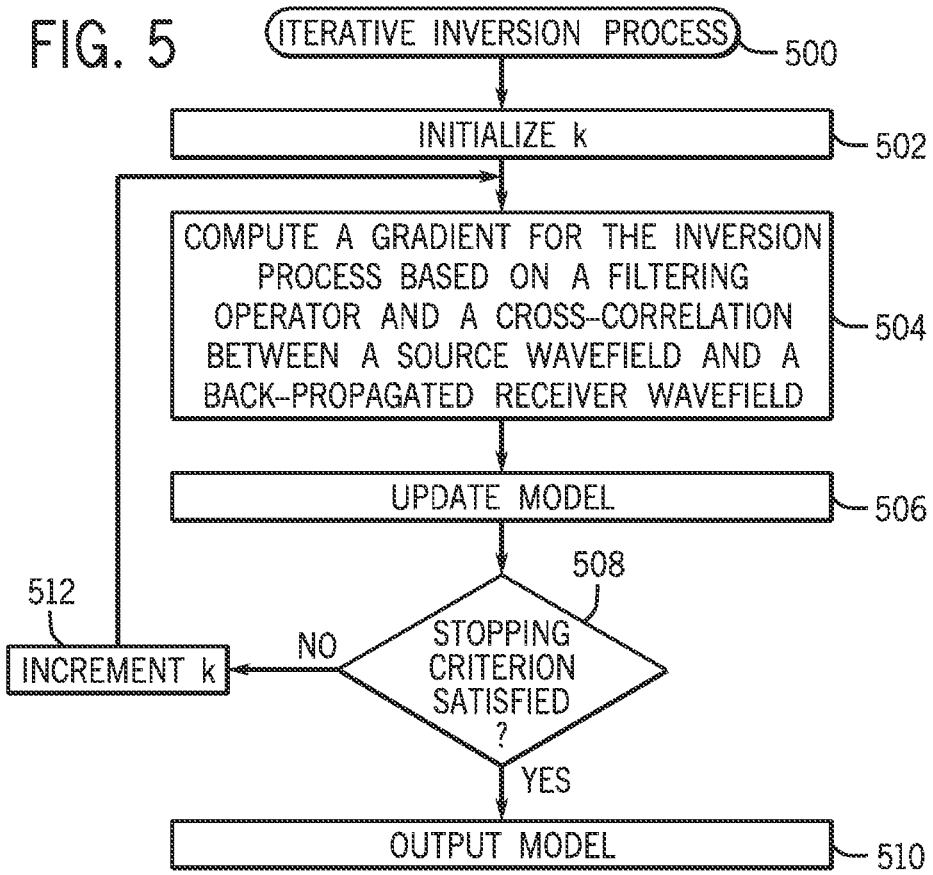

INVERSION USING A FILTERING OPERATOR

BACKGROUND

Seismic surveying is used for identifying subterranean elements, such as hydrocarbon reservoirs, freshwater aquifers, gas injection zones, and so forth. In seismic surveying, seismic sources (such as seismic vibrators, air guns, or other types of sources) are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for measurement by seismic receivers (e.g., geophones, accelerometers, etc.). These seismic receivers produce signals that represent detected seismic waves. Signals from seismic receivers are processed to yield information about the content and characteristic of the subterranean structure.

SUMMARY

In general, according to some implementations, a representation of a source wavefield and a representation of a back-propagated receiver wavefield in a structure are received. A filtering operator is computed based at least on an angle between a propagating direction of the source wavefield and a propagating direction of the back-propagated receiver wavefield. The filtering operator is used in performing the inversion to produce a model of the structure.

In general, according to further implementations, an article includes at least one machine-readable storage medium that stores instructions that upon execution cause a system to compute a filtering operator based at least on an angle between a propagating direction of a source wavefield and a propagating direction of a back-propagated receiver wavefield in a structure. The filtering operator is iteratively applied in a plurality of iterations of an inversion process for producing a model of the structure, where applying the filtering operator causes reduction of a backscattering artifact in the model.

In general, according to yet further implementations, a computing system includes at least one processor to receive a representation of a source wavefield and a representation of a back-propagated receiver wavefield in a structure, and to compute a filtering operator based at least on an angle between a propagating direction of the source wavefield and a propagating direction of the back-propagated receiver wavefield. The filtering operator is used in performing the inversion to produce a model of the structure.

In further or other implementations, the filtering operator used in performing the inversion filters out a backscattering artifact in the model.

In further or other implementations, in performing the inversion, the filtering operator is combined with a function that is based on at least one wavefield selected from the group consisting of the source wavefield and the back-propagated receiver wavefield.

In further or other implementations, using the filtering operator includes computing a gradient of an objective function of the inversion.

In further or other implementations, the objective function represents a misfit between observed data collected by at least one survey receiver, and synthetic data computed by a simulation based on the model.

In further or other implementations, the gradient of the objective function is computed further based on a cross-correlation between the source wavefield and the back-propagated receiver wavefield.

In further or other implementations, the filtering operator is a function of angles within one or more ranges of angles.

In further or other implementations, the model of the structure is built using the inversion.

In further or other implementations, the propagating direction of the source wavefield is a local propagating direction of the source wavefield, and the propagating direction of the back-propagated receiver wavefield is a local propagating direction of the back-propagated receiver wavefield.

In further or other implementations, the inversion process is iteratively performed with the plurality of iterations until a stopping criterion is satisfied.

In further or other implementations, applying the filtering operator includes combining the filtering operator with a function based on at least one wavefield selected from the group consisting of the source wavefield and the back-propagated receiver wavefield.

In further or other implementations, the function is a cross-correlation of the source wavefield and the back-propagated receiver wavefield.

In further or other implementations, combining the filtering operator with the function produces a gradient of an objective function of the inversion process, and the inversion process is to reduce a misfit between observed data from at least one survey receiver and synthetic data produced by simulation based on the model.

In further or other implementations, the model includes a model of a subterranean structure.

In further or other implementations, the plurality of iterations are to incrementally update the model.

In further or other implementations, use of the filtering operator is to remove a backscattering artifact.

Other or additional features will be apparent from the following description, from the drawings, and from the claims. The summary is provided to introduce a selection of concepts that are further described below in the detailed description. The summary is not to be intended to be used as an aid in limiting the scope of the claimed subject matter.

BRIEF DESCRIPTION OF THE DRAWINGS

Some embodiments are described with respect to the following figures:

FIGS. 4 and 5 are flow diagrams of inversion processes according to some implementations.

DETAILED DESCRIPTION

Figure 1:
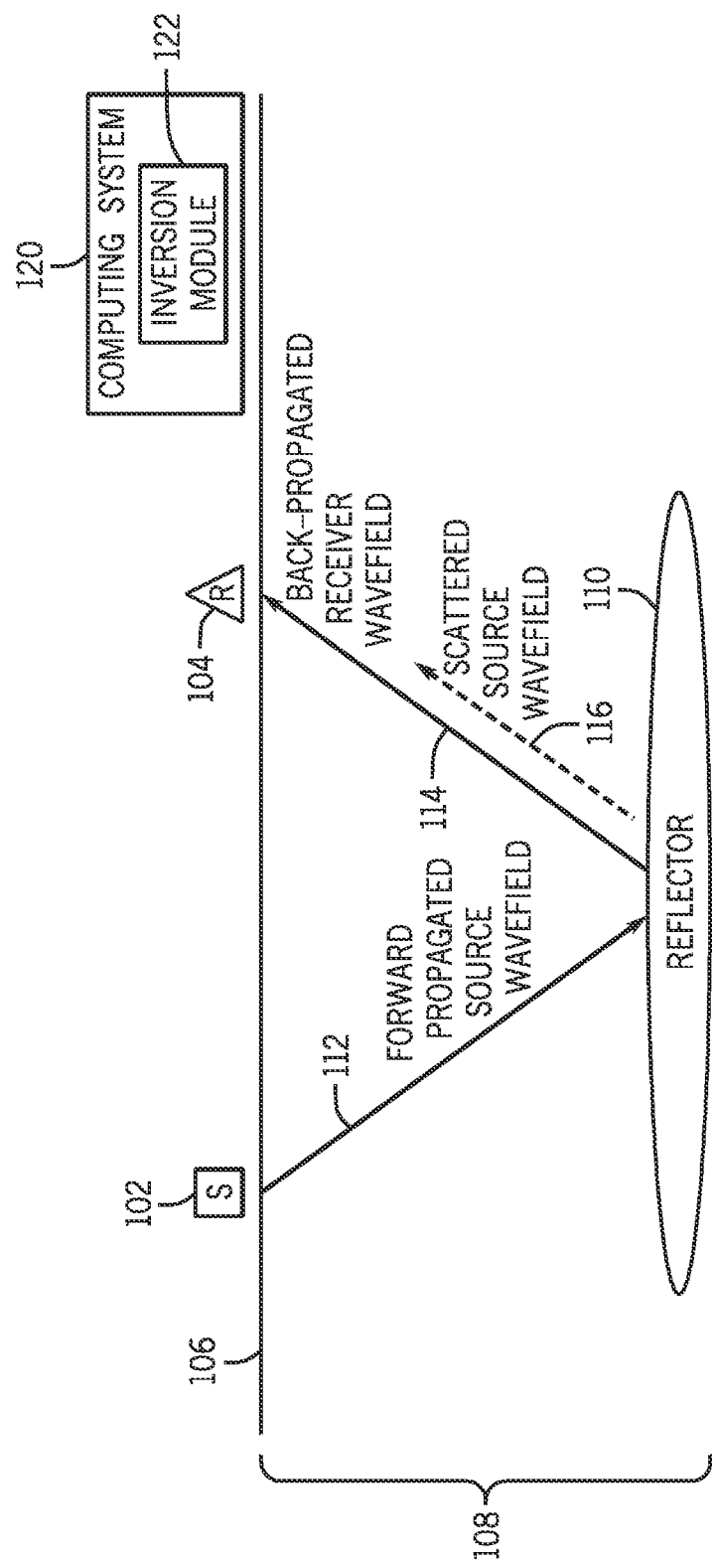
FIG. 1 is a schematic diagram of an example arrangement that includes a survey source and a survey receiver to perform a survey operation, and a computing system that includes an inversion module according to some implementations.

Inversion can be applied to observed survey data (e.g. seismic survey data, acoustic survey data, etc.) to build a model of a subterranean structure, where the subterranean structure may contain at least one element of interest (e.g.

hydrocarbon reservoir, freshwater aquifer, gas injection zone, etc.). One type of inversion is full-wave inversion (FWI), which is used to build the model of the subterranean structure by performing iterative minimization (or reduction) of a misfit (or mismatch) between observed survey data and synthetic survey data. FWI can use the full information content of a seismogram (containing data as measured by one or more survey receivers). The full information content can include phase information and amplitude information.

Observed survey data refers to data collected by a survey receiver (or multiple survey receivers), such as geophones, accelerometers, and so forth, during a survey operation. In a survey operation, at least one survey source (e.g. seismic source, acoustic source, etc.) is activated to produce a seismic wave that is propagated into the subterranean structure. A portion of the seismic wave that is reflected from a reflector in the subterranean structure to a detection location can be measured by survey receiver(s). The detection location can be an earth surface (e.g. land surface, sea floor), or the detection location can be a wellbore drilled into the subterranean structure.

Synthetic data refers to data produced by simulation based on a current model of the subterranean structure. The model can be a velocity model that models the velocity profile (velocity of signals propagating at various locations in the subterranean structure), or some other parameter of the subterranean structure.

In some examples, iterative minimization (or reduction) of the misfit between the observed data and synthetic data refers to a process of iteratively updating the model of the subterranean structure until a predefined stopping criterion is satisfied (e.g. the difference between the observed data and the synthetic data is less than some predefined value, a predefined number of iterations have been performed, etc.). The inversion process is considered to have converged when the predefined stopping criterion is satisfied.

In some cases, backscattering artifacts may be seen in an inverted model produced using an inversion process, such as an FWI process. Presence of backscattering artifacts in the model produced by an inversion process can be pronounced if the inversion process is stopped after a relatively small number of iterations. Also, due to the presence of backscattering artifacts, convergence of the inversion process can be relatively slow.

In accordance with some implementations, techniques or mechanisms are provided to remove effects of backscattering artifacts, such that a more accurate model of the subterranean structure can be produced using an inversion process, and the inversion process can converge more quickly.

In the ensuing discussion, reference is made to techniques or mechanisms applied with respect to subterranean structures. However, techniques or mechanisms according to some implementations can also be applied with respect to other structures that are the subject of a survey, such as human tissue, mechanical structures, and so forth.

FIG. 1 illustrates an example survey arrangement that includes a survey source 102 and a survey receiver 104, both provided at an earth surface 106 above a subterranean structure 108. Although just one survey source 102 and survey receiver 104 are depicted, note that there can be multiple survey sources 102 and/or survey receivers 104. The subterranean structure 108 includes a reflector 110, which can represent a subterranean element of interest such as a hydrocarbon reservoir, a freshwater aquifer, a gas injection zone, and so forth. In different examples, a wellbore can be drilled into the subterranean structure 108, and either one or both of the survey source 102 and survey receiver 104 can be placed in the wellbore instead of or in addition to being placed at the earth surface.

The survey source 102 produces a survey wave that is propagated into the subterranean structure 108. This survey wave is represented by a source wavefield that propagates generally along direction 112 in the subterranean structure 108. The source wavefield along direction 112 is a forward-propagated wavefield that has been forward propagated in time and space to a location of the reflector 110. Once the source wavefield reaches the reflector 110, a portion of the source wavefield is reflected (scattered) and propagated to the earth surface 106 for detection by the survey receiver. This scattered source wavefield propagates along direction 116 in FIG. 1. In FIG. 1, arrow 114 represents a direction of a back-propagated receiver wavefield, which is the reflected wavefield (as measured by the survey receiver 104), back-propagated in time and space to the location of the reflector 110.

Backscattering artifacts can occur when the back-propagated receiver wavefield (along 114) and the scattered source wavefield (along direction 116) are moving in the same direction, for example. As noted above, the reflector 110 causes a reflection in response to the source wavefield emitted by the source 102. The scattered source wavefield traveling along direction 116 travels back towards the survey receiver 104 and causes an artifact that correlates with the back-propagated receiver wavefield 114. The scattered source wavefield along direction 116 can cause the backscattering artifact discussed above, which can affect the accuracy of a model of the subterranean structure 108 produced using an inversion process, and can slow convergence of the inversion process. The backscattering artifact is caused by interference (due to cross-correlation) between the scattered source wavefield and the receiver wavefield when they are traveling in the same direction. Similarly, artifacts arise due to unwanted cross-correlations between the source wavefield and backscattered energy in the receiver wavefield when they are traveling in the same direction.

FIG. 1 also shows a computing system 120, which can include a computer or a collection of computers. In accordance with some implementations, the computing system 120 includes an inversion module 122 that is used for performing the inversion process according to some implementations, where the inversion process includes backscattering artifact reduction.

Figure 2:
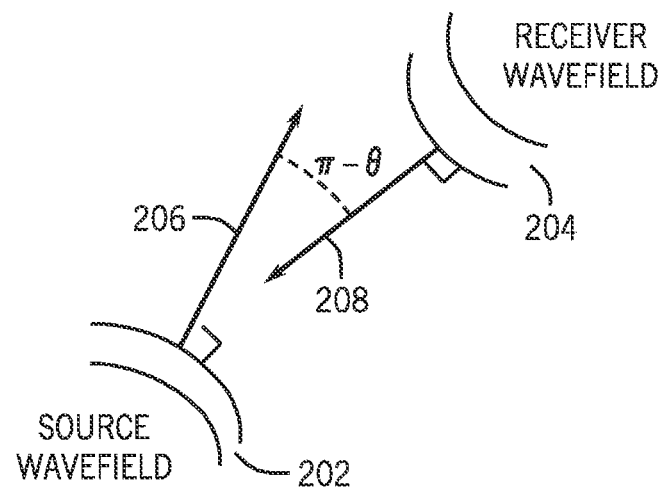
FIG. 2 illustrates a source wavefield and a receiver wavefield, and an angle between the source wavefield and receiver wavefield.

FIG. 2 illustrates a source wavefield 202 and a receiver wavefield 204. The source wavefield 202 has a propagation direction represented by arrow 206, which is generally normal to the source wavefield 202. The propagation direction represented by arrow 206 can be the same as the propagation direction 112 (or 116) depicted in FIG. 1. Similarly, the receiver wavefield 204 has a direction of propagation represented by 208 that is generally normal to the receiver wavefield 204. The angle between the propagation direction 206 and the propagation direction 208 is $\pi-\theta$, where $\pi$ represents 180°.

The receiver wavefield 204 refers to the receiver wavefield that propagates from the reflector 110 to the earth surface 106 (direction 114 of the back-propagated receiver wavefield shown in FIG. 1). Note that FIG. 2 shows the angle between the source wavefield 202 and receiver wavefield as being $\pi-\theta$; the angle between the source wavefield 202 and a back-propagated receiver wavefield would be 180° out of phase, and thus would be represented as $\theta$.

Determining a normal of a wavefield (for the purpose of determining the propagation direction of the wavefield) can be performed using any of various techniques. An example technique uses optical flow estimation for estimating a direction of motion of a wave, such as that described in David J. Fleet et al., "Optical Flow Estimation," Mathematical Models in Computer Vision: The Handbook, pp. 239-258 (2005). Other example techniques of determining a normal of a wavefield can be used in other implementations.

Backscattering artifacts are caused by cross-correlation between wavefields along a particular direction, in this case the source wavefield and the backscattered wavefield, which corresponds to θ being 0° in FIG. 2. Cross-correlation refers to a measure of similarity of two waveforms (in this case similarity of the source wavefield with the backscattered wavefield). The measured receiver wavefield 204 can contain a contribution due to cross-correlation between the source wavefield and the backscattered wavefield, which occurs at θ being 0° (or in a range close to 0°).

In accordance with some implementations, a filtering operator is defined that filters (removes or reduces) contribution of the backscattering artifacts during an inversion process to produce a model of a subterranean structure.

The ensuing discussion refers to techniques according to some implementations that can be used with a time-domain FWI process for constructing a model of a subterranean structure (an earth model). However, techniques according to some implementations can also be applied to other types of inversion processes, including an FWI process in the frequency domain (also referred to as "elastic FWI"), or any other type of inversion process.

In some embodiments, when producing a model of a subterranean structure using FWI, the misfit (or mismatch) between the observed data and synthetic data is reduced (or minimized) by performing multiple iterations of the FWI process. In some examples, an objective function can be represented as $$J = \frac{1}{2} \sum_s \sum_r \int_t \phi_{s,r}(t)(o_{s,r}(t) - p_{s,r}(t))^2 \, dt, \quad \text{(Eq. 1)}$$

where $o_{s,r}(t)$ represents observed data for a given source (s) and receiver (r), at a particular time (t), and $p_{s,r}(t)$ represents synthetic data for a given source (s) and receiver (r) at a given time (t). In other examples, other types of objective functions can be used. $\phi_{s,r}(t)$ represents any time-dependent filtering operator operating on the data at receiver locations. The computation of Eq. 1 is summed over multiple sources and multiple receivers.

In performing various iterations of FWI processes, a goal can be to construct a model of a subterranean structure where the objective function is reduced (or minimized). In some FWI processes, a gradient, represented as g(x), of J (the objective function) with respect to a medium parameter m (e.g. velocity or other parameter) is given by a cross-correlation $$g(\underline{x}) = \sum_{sources} \sum_{receivers} \int_o^T \left( \frac{\partial L}{\partial m} u_s(\underline{x}, t) \right) u_r(\underline{x}, T - t) \, dt, \quad \text{(Eq. 2)}$$

where x represents a coordinate in a volume representing the subterranean structure, T represents a length of a time window (e.g. total time of a particular simulation to compute the synthetic data), and L is a wave equation operator that is written symbolically as Lu=f (where u can be $u_s$ or $u_r$ and f is a force function). Here $u_s$ is the source wavefield and $u_r$ is the back-propagated receiver wavefield used in full-wave inversion with the cost function given in Eq. 1. The gradient of Eq. 2 is used to update the model over iterations of the FWI process.

Wavefront normals for the source wavefield ($u_s$) and the back-propagated receiver wavefield ($U_r$), respectively, are represented as $v_s$ and $v_r$, respectively. A wavefront normal refers to a direction of propagation of a wavefront, in this case the source wavefield or the back-propagated receiver wavefield.

In some embodiments, the filtering operator for removing or reducing contributions of backscattering artifacts, mentioned above, is dependent on the angle θ(x) between the propagation directions as represented by the wavefront normals $v_s$ and $v_r$. The angle θ(x) is depicted in FIG. 2. As noted above, FIG. 2 shows the angle between the source wavefield 202 and receiver wavefield as being π−θ; the angle between the source wavefield 202 and a back-propagated receiver wavefield would be 180° out of phase, and thus would be represented as θ. Eq. 3 below can be used to compute θ (more specifically, θ(x,t)) based on the wavefront normals $v_s$ and $v_r$:

$$\cos(\theta(x, t)) = \frac{-\underline{v}_s(x, t) \cdot \underline{v}_r(x, t)}{\|\underline{v}_s(x, t)\| \|\underline{v}_r(x, t)\|}, \quad \text{(Eq. 3)}$$

where $v_s(x,t)$ is the wavefront normal for the propagating source wavefield as a function of position x (e.g. coordinates in three dimensions) and time (t), $v_r(x,t)$ is the wavefront normal for the back-propagated receiver wavefield as a function of position x and time t, and cos(θ(x,t)) is the cosine of the angle θ(x,t), which is a function of position (x) and time (t). Note that the direction of propagation of a source wavefield and/or a back-propagated receiver wavefield can vary at different positions in the subterranean structure and over time. Thus, at any given position and time, the angle θ(x,t) between the local propagation direction of the source wavefield and the local propagation direction of the back-propagated receiver wavefield is considered a local angle (local in terms of position and time). In accordance with some implementations, the gradient calculation of Eq. 2 can be modified by the filtering operator, represented as w(x,θ), as follows:

$$g(\underline{x}) = \sum_{sources} \sum_{receivers} \int_o^T w(x, \theta) \frac{\partial L}{\partial m} u_s(x, t) u_r(x, T - t) \, dt, \quad \text{(Eq. 4)}$$

Figure 3:
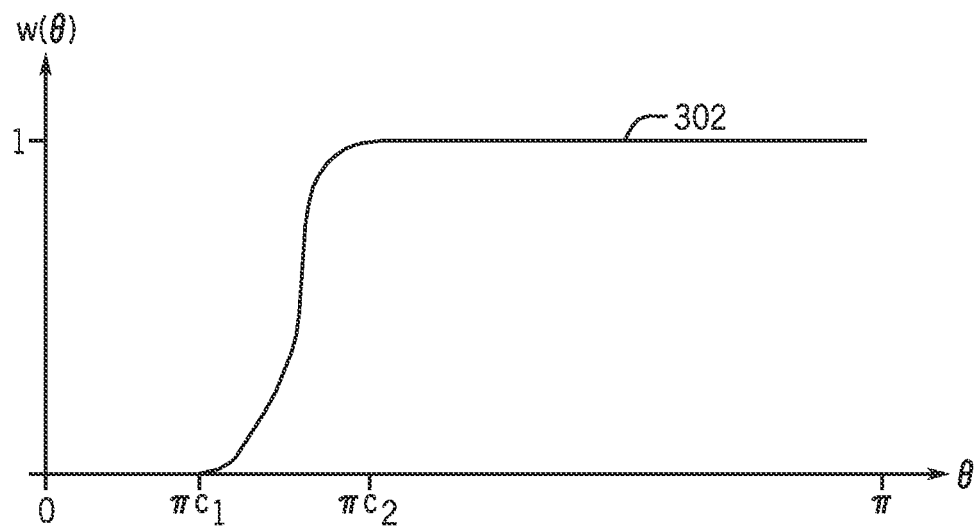
FIG. 3 is a graph illustrating an example of a filtering operator according to some implementations.

An example of the filtering operator w(x,θ) is shown in FIG. 3, where a curve 302 represents values of w(x,θ) as a function of angle θ. In the example of FIG. 3, the value of w(x,θ) is in the range between 0 and 1. Effectively, the filtering operator w(x,θ) acts as a high-pass filter—the value of the gradient g(x) is equal to the cross-correlation given by Eq. 2 when the filtering operator w(x,θ) has the value 1 (for values of the angle θ greater than $\pi c_2$), and the value of the gradient g(x) is equal to zero when the filtering operator w(x,θ) has the value 0 (for values of the angle θ less than $\pi c_1$). In other words, the filtering operator w(x,θ) removes contributions for $\theta < \pi c_1$. More generally, in some implementations, the filtering operator has a first value for values of the angle in a first range (e.g. θ greater than $\pi c_2$), and a second value for values of the angle in a second, different range (e.g. θ less than $\pi c_1$). The filtering operator is generally a function of angles within corresponding one or more ranges of angles.

As noted above, backscattering artifacts due to cross-correlation between the source wavefield (112 in FIG. 1) and the backscattered wavefield (116 in FIG. 1) occur for θ at zero or close to zero. In the example of FIG. 3, it is assumed that backscattering artifacts occur for θ less than $\pi c_1$, which is a predefined value.

As seen in FIG. 3, the value of the filtering operator $w(x,\theta)$ transitions between 0 and 1 at values of the angle θ between $\pi c_1$ and $\pi c_2$. FIG. 3 is depicted for purposes of example—other forms of the filtering operator may be used in other examples.

In some implementations, the parameters $c_1$ and $c_2$ can be predefined constants (both a positive fractional value less than 1) that are chosen to adjust the angle weighting for the filtering operator. The values of the parameters $c_1$ and $c_2$ can be calculated empirically or based on expert knowledge. As a specific example, $c_1$ can be set equal to 0.2, while $c_2$ can be set equal to 0.5—in other examples $c_1$ and $c_2$ can be set equal to other fractional values.

By filtering backscattering artifacts using the filtering operator $w(x,\theta)$ as discussed above, artifacts in gradient images (produced by the calculation of the gradient $g(x)$ according to Eq. 4) can be removed or reduced. As a result, a model of a subterranean structure that is produced using the gradient $g(x)$ in an FWI process can be more accurate, since the backscattering artifacts are removed—moreover, convergence of the FWI process can be quicker.

FIG. 4 is a flow diagram of an inversion process 400 (e.g., an FWI process) according to some implementations. The inversion process can be performed by the inversion module 122 in the computing system 120, for example.

The process receives (at 402) a representation of a source wavefield and a representation of a back-propagated receiver wavefield in a subterranean structure. The representations can be in the form of data containing the respective wavefields. The data can be stored in a storage medium, or can be received over a network.

The process next computes (at 404) a filtering operator (e.g. $w(x,\theta)$) based on an angle (θ) between a propagating direction of the source wavefield and a propagating direction of the back-propagated receiver wavefield. The process then uses (at 406) the filtering operator in performing the inversion process to produce a model of the subterranean structure.

In some embodiments, inversion processes can be performed on an iterative basis. The iterative inversion process is performed in multiple iterations k, where k starts at 1 and is incremented until a stopping criterion is satisfied. As shown in the example of FIG. 5, an iterative process 500 begins with initializing the variable k (at 502), such as to an initial value 1. Next, the process of FIG. 5 computes (at 504) a gradient of an objective function for the inversion process. As noted above, the objective function is to reduce (or minimize) the misfit between observed data and synthetic data. The gradient of such objective function can be computed according to Eq. 4, where the gradient is computed based on the filtering operator the filtering operator $w(x,\theta)$ and the cross-correlation between the source wavefield and the back-propagated receiver wavefield.

The process of FIG. 5 then incrementally updates (at 506) a model of a subterranean structure, where the model is represented as m. The model at any given iteration k is represented as m(k). In iteration k, the model m(k) is updated (at 506) as follows:

$$m(k)=m(k-1)+\gamma(k)\cdot g(k),$$

where m(k−1) is the model produced in the previous iteration k−1, γ(k) is a scaling factor, and g(k) is the gradient computed according to Eq. 4.

The process of FIG. 5 next determines (at 508) if a stopping criterion has been satisfied. If so, the updated model is output (at 510). Otherwise, the variable k is incremented (at 512), and tasks 504, 506, and 508 are performed again until the stopping criterion is satisfied. Computing the gradient (task 504) in successive iterations accumulates the gradient computed according to Eq. 4.

Figure 6:
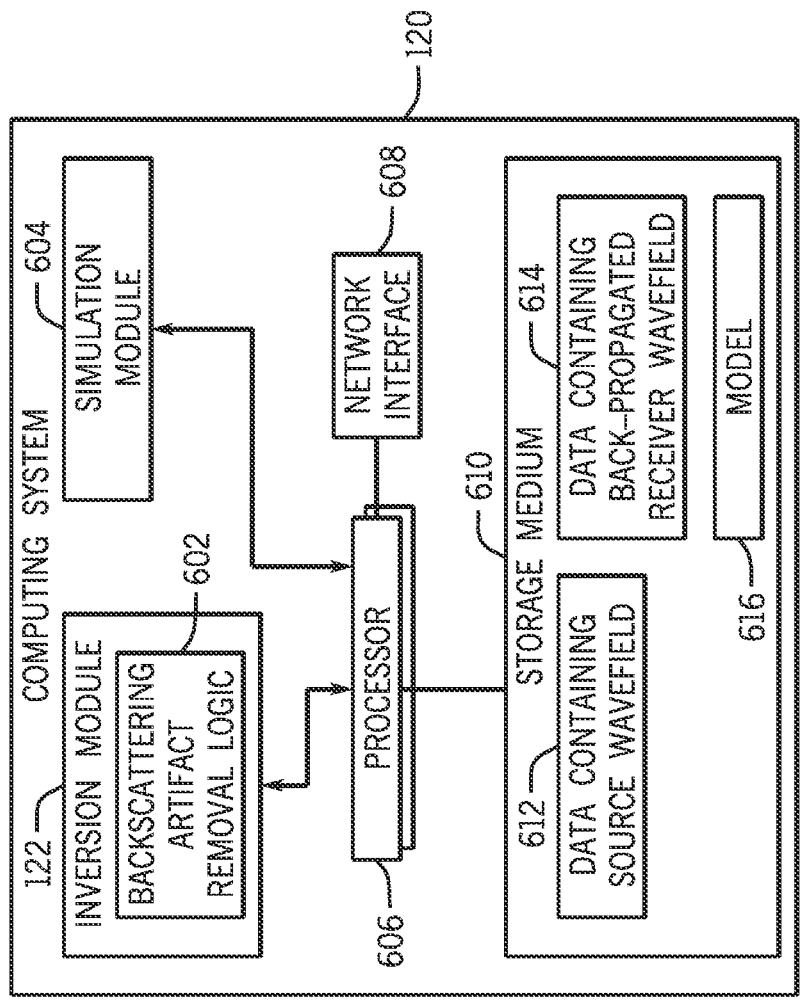
FIG. 6 is a block diagram of a computing system that incorporates some implementations.

FIG. 6 is a block diagram of example components of the computing system 120. The computing system 120 includes the inversion module 122 that includes backscattering artifact removal logic 602 according to some implementations. In some embodiments, the backscattering artifact removal logic 602 is able to compute the filtering operator discussed above, for example, for use in computing a gradient of the inversion process as performed by the inversion module 122. In some examples, the computing system 120 also includes a simulation module 604, which is able to perform a simulation using a current model (e.g., 616 in FIG. 6) of the subterranean structure to produce synthetic data. The current model can be the model m(k) updated in a current iteration k, as discussed above in connection with FIG. 5.

In some implementations, the inversion module 122 and simulation module 604 can be implemented with machine-readable instructions that are executable on one or multiple processors 606. A processor can include a microprocessor, microcontroller, processor module or subsystem, programmable integrated circuit, programmable gate array, or another control or computing device. The processor(s) 606 can be connected to a network interface 608 to allow the computing system 120 to communicate over a network.

In addition, the processor(s) 606 can be connected to a storage medium (or storage media) 610, which can store various types of information, including data containing a source wavefield (612), data containing a back-propagated receiver wavefield (614), and the model (616).

The storage medium (or storage media) 610 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving a representation of a source wavefield and a representation of a back-propagated receiver wavefield in a structure;
computing a filtering operator based at least on an angle between a propagating direction of the source wavefield and a propagating direction of the back-propagated receiver wavefield; and
using the filtering operator in performing an inversion to produce a model of the structure, wherein using the filtering operator includes computing a gradient of an objective function of the inversion.

2. The method of claim 1, wherein using the filtering operator in performing the inversion filters out a backscattering artifact in the model.

3. The method of claim 1, further comprising:
in performing the inversion, combining the filtering operator with a function that is based on at least one wavefield selected from the group consisting of the source wavefield and the back-propagated receiver wavefield.

4. The method of claim 1, wherein the objective function represents a misfit between observed data collected by at least one survey receiver, and synthetic data computed by a simulation based on the model.

5. The method of claim 1, wherein computing the gradient of the objective function is further based on a cross-correlation between the source wavefield and the back-propagated receiver wavefield.

6. The method of claim 1, wherein the filtering operator is a function of angles within one or more ranges of angles.

7. The method of claim 1, further comprising building the model of the structure using the inversion.

8. The method of claim 1, wherein the propagating direction of the source wavefield is a local propagating direction of the source wavefield, and the propagating direction of the back-propagated receiver wavefield is a local propagating direction of the back-propagated receiver wavefield.

9. An article comprising at least one non-transitory machine-readable storage medium that stores instructions that upon execution cause a system to:
compute a filtering operator based at least on an angle between a propagating direction of a source wavefield and a propagating direction of a back-propagated receiver wavefield in a structure; and
iteratively apply the filtering operator in a plurality of iterations of an inversion process for producing a model of the structure, wherein applying the filtering operator causes reduction of a backscattering artifact in the model, and wherein the filtering operator is applied as part of computing a gradient of an objective function of the inversion process.

10. The article of claim 9, wherein the inversion process is iteratively performed with the plurality of iterations until a stopping criterion is satisfied.

11. The article of claim 9, wherein applying the filtering operator comprises combining the filtering operator with a function based on at least one wavefield selected from the group consisting of the source wavefield and the back-propagated receiver wavefield.

12. The article of claim 11, wherein the function comprises a cross-correlation of the source wavefield and the back-propagated receiver wavefield.

13. The article of claim 11, wherein the filtering operator has a first value for values of the angle in a first range, and has a second value for values of the angle in a second range.

14. The article of claim 11, wherein combining the filtering operator with the function produces the gradient of the objective function of the inversion process, the inversion process to reduce a misfit between observed data from at least one survey receiver and synthetic data produced by simulation based on the model.

15. The article of claim 9, wherein the model includes a model of a subterranean structure.

16. A computing system comprising:
at least one processor to:
receive a representation of a source wavefield and a representation of a back-propagated receiver wavefield in a structure;
compute a filtering operator based at least on an angle between a propagating direction of the source wavefield and a propagating direction of the back-propagated receiver wavefield; and
use the filtering operator in performing an iterative inversion process to produce a model of the structure, wherein the iterative inversion process reduces a misfit between observed data from at least one survey receiver and synthetic data produced by simulation based on the model.

17. The computing system of claim 16, wherein the iterative inversion process includes a plurality of iterations, and wherein the filtering operator is to be used in each of the plurality of iterations.

18. The computing system of claim 17, wherein the plurality of iterations are to incrementally update the model.

19. The computing system of claim 16, wherein use of the filtering operator is to remove a backscattering artifact.

20. The computing system of claim 16, wherein the at least one processor is to compute, using the filtering operator, a gradient of an objective function of the iterative inversion process.

21. The computing system of claim 16, wherein the iterative inversion process comprises an iterative full-wave inversion (FWI) process.

* * * * *